US005594790A

United States Patent [19]
Curreri et al.

[11] Patent Number: 5,594,790
[45] Date of Patent: Jan. 14, 1997

[54] METHOD FOR SELECTING AND CONTROLLING THE AUTOMATIC DIALING OF A CALL RECORD CAMPAIGN

[75] Inventors: Anthony Curreri, Litchfield; B. Scott Smith, Londonderry; G. Mark Jennings, Brookline, all of N.H.

[73] Assignee: Davox Corporation, Westford, Mass.

[21] Appl. No.: 252,339

[22] Filed: Jun. 1, 1994

Related U.S. Application Data

[63] Continuation-in-part of Ser. No. 5,481, Jan. 14, 1993, Pat. No. 5,343,518.

[51] Int. Cl.$^6$ ................................................. H04M 3/00
[52] U.S. Cl. .................... 379/265; 379/266; 379/309; 379/216; 379/355; 379/356; 379/92
[58] Field of Search .......................... 379/265, 266, 379/309, 355, 216, 356, 92

[56] References Cited

U.S. PATENT DOCUMENTS

| | | | |
|---|---|---|---|
| 4,829,563 | 5/1989 | Crockett et al. | 379/309 |
| 4,881,261 | 11/1989 | Oliphant | 379/309 |
| 4,894,857 | 1/1990 | Szlam et al. | 379/67 |
| 4,896,345 | 1/1990 | Thorne | 379/67 |
| 5,214,688 | 5/1993 | Szlam et al. | 379/67 |
| 5,327,490 | 7/1994 | Cave | 379/309 |
| 5,341,412 | 8/1994 | Ramot et al. | 379/265 |
| 5,343,518 | 8/1994 | Kneipp | 379/265 |
| 5,425,093 | 6/1995 | Trefzger | 379/309 |
| 5,436,965 | 7/1995 | Grossman et al. | 379/309 |
| 5,467,391 | 11/1995 | Donaghue, Jr. et al. | 379/265 |

*Primary Examiner*—Jeffery Hofsass
*Assistant Examiner*—Parag Dharia
*Attorney, Agent, or Firm*—Daniel J. Bourque, Esq.; Kevin J. Carroll, Esq.

[57] ABSTRACT

A method for controlling the flow of a first call record campaign to a second call record campaign, by a telephony system. Wherein after determining that a first call record campaign is not being driven to its maximum capacity and there are no more call records to dial, the system assigns a second campaign attribute to agents having a first campaign attribute. In response, the system initiates processing of the second call record campaign by processing a call record from the second call record campaign. The system detects the completion of additional call records from the first call record campaign and initiates processing of a corresponding number of call records from the second call record campaign, thereby seamlessly transitioning from the ending of the first call record campaign to the beginning of the second call record campaign. The method further includes the steps of establishing and modifying the call record campaigns with call record selection criteria, by sequentially scanning a common database with call record selection criteria, identifying and copying a number of call records meeting the call record selection criteria, and inserting the identified call records into call record groups. The call record groups are joined together forming a call record campaign which is subsequently provided to the telephony system for dialing a telephone number included in each call record.

11 Claims, 8 Drawing Sheets

METHOD FOR SELECTING AND CONTROLLING THE AUTOMATIC DIALING OF A CALL RECORD CAMPAIGN

RELATED APPLICATION

This Application is a continuation-in-part of U.S. patent application Ser. No. 08/005,481 filed Jan. 14, 1993, now Pat. No. 5,343,518 entitled A SYSTEM AND METHOD FOR CONTROLLING THE DIALING ORDER OF RECORD LISTS IN AN AUTOMATED DIALING SYSTEM which is fully incorporated herein by reference.

FIELD OF THE INVENTION

This invention relates to telephony management systems and more particularly, to predictive dialer management systems.

BACKGROUND OF THE INVENTION

As is known in the art, predictive dialer systems typically perform call processing operations and manage the two-way flow of data between a host computer, an operator workstation and a predictive dialer and the two way flow of voice signals between an operator and a called party. Typically, call records which include telephone numbers to be called, are down loaded as a batch file from the host computer to a telecommunication system management unit.

As is also known, such dialing systems use groups of call records generally referred to as a "list." The list is typically generated by grouping call records having a common characteristic such as amount overdue, area code, time zone, etc. Such lists are provided to the predictive dialer. An operator "logs on" to one of the lists through the predictive dialer and the predictive dialer performs the dialing function. The operator must wait until the dialer provides an answered call to the operator.

When the dialer dials a phone number however, the dialer may get no answer, a busy signal or an answering machine before getting a live answer to connect to an operator. When each of the call records in a particular list have been dialed, the predictive dialer automatically "logs off" the operator from the list. Thus, it is possible for the operator to be logged off without ever being connected to a line or party. Furthermore, after the operator is "logged off", the operator typically fails to have any tasks to perform and thus the operator continues to be unproductive.

An operator supervisor will have then typically prepared another call list which the operator may log on to. Therefore the operator must manually log on to a second list which the supervisor has prepared and made available to be dialed before calls can be connected to that operator.

Generally, the operator supervisor must constantly monitor the condition of the lists being dialed and the operator assignments. Once an operator becomes available, that is, once the predictive dialer has logged the operator off a list that is ending, the supervisor must then communicate to the operator which list the operator should next log on to. This process of manually logging on and logging off lists is time consuming, inefficient and causes the operator to experience considerable amount of downtime or idle time.

This problem is compounded when there exists a large number of lists each consisting of a small number of call records. For example, when a list having only 1 or 2 call records is provided to the operator, the dialing system rapidly dials the 2 numbers in the list. In this situation, the operator logs on to the list and shortly thereafter the predictive dialer logs the operator off the list. Thus, the amount of downtime each operator experiences is further increased since the operator is often waiting for the supervisor to prepare a new list and direct the operator to log on to the new list.

Most of the limitations of the prior art have been remedied by the above referenced co-pending application, of which the present invention is a continuation-in-part, and assigned to the assignee of the present invention and fully incorporated herein be reference. The co-pending application provides a predetermined sequence of call lists and operator assignments for dialing a flow of call records, thereby minimizing the amount of unproductive time existing between assignments.

The method of the co-pending application includes the steps of selecting a set of calling lists, each calling list containing at least one call record, and ordering the set of calling lists in a predetermined order. One record from a first call list is joined to one record from a second call list to provide a flow. The flow is applied to a predictive dialer such that the predictive dialer may dial phone numbers in a predetermined order as directed by the flow. As a call list within a flow is ended, all operators logged onto that list are automatically logged onto the next calling list in the flow.

A limitation of the system described in the co-pending application, however, is that the call record lists are selected prior to applying the call record flow to the predictive dialer for call processing. Once the flow is applied, the flow characteristics and call record control programs are bound to the flow without the capability of modification until the flow has been executed or manually ended.

A further limitation of the prior art system requires that agents log onto specific call record lists within a specific flow. Thus, a delay in transition from one call record list to another call record list and from one flow to another flow, is present. This transition delay results in an increase in hold times and number of aborts.

A further limitation of the prior art systems requires the call record lists to be selected by an exclusion filtering process which examines the entire database of call records before a call record list can be generated.

Accordingly, what is needed is a system and method which provides a call record campaign having a rules based dialing process. Such call record campaigns should include campaign attributes and system call control programs capable of real-time modifications. Further, a method for applying campaign resources, such as agents, to the telephony system, and subsequently assigning the agents to service particular call records within any call record list is required. Additionally, an inclusion filtering process is required for selecting call records from a common database of call records to comprise a call record campaign.

SUMMARY OF THE INVENTION

In accordance with the present invention, a method for controlling the flow of a first call record campaign to a second call record campaign, by a telephony system, is provided. The method includes the steps of establishing at least a first call record campaign and a second call record campaign and establishing a link between the first call record campaign and the second call record campaign, for controlling the dialing of a plurality of predetermined call records.

The method further includes the steps of initiating processing of the first call record campaign by providing a first call record group included in the first call record campaign, to a call record campaign manager included in the telephony system, and processing a first call record from the first call record campaign. After detecting the end of the process first call record, the telephony system determines when the first call record campaign is not being driven to its maximum capacity. After determining that the first call record campaign is not fully driven, the telephony system determines if more call records are available in the first call record campaign to process.

If there are more call records to process, an additional number of call records from the first call record campaign are processed.

If there are no more call records to process in the first call record campaign, a second campaign attribute is provided to at least one agent having a first campaign attribute. Subsequently, the telephony system in the first call record campaign, initiates processing of the second call record campaign by processing a second call record from the second call record campaign.

In response to detecting the end of an additional number of call records from the first call record campaign, the method further includes the step of initiating processing of a corresponding number of call records from the second call record campaign, thereby beginning processing of the second call record campaign concurrently with the ending of the first call record campaign.

In the preferred embodiment, the step of initiating processing of the first call record campaign comprises the steps of sequentially scanning a common database, which includes the plurality of predetermined call records, by at least a first call record selection criterion included in the first call record campaign. A first number of the plurality of predetermined call records are identified which meet the call record selection criterion and are copied and inserted into at least a first call record group. Each of the call record groups are provided to the telephony system in a predetermined order for processing the copied call records.

The step of establishing at least a first and second call record campaign comprises the steps of providing at least one user defined campaign attribute, at least one campaign call script and a campaign pacing option to each of the call record campaigns. The user defined campaign attributes establish the operational parameters of each call record campaign. Campaign call scripts are provided to each campaign to control the processing of the predetermined call records by the telephony system, responsive to the user defined campaign attributes.

Further, each call record campaign includes a pre-selected campaign pacing option. The pre-selected campaign pacing option may include a pacing ratio which equals the number of call records to be dialed by the telephony system for each agent having the particular campaign attribute. Alternatively, each pre-selected campaign pacing option may include a percent connect option which varies the rate of dialing by the telephony system to achieve a desired percentage of answered calls to be connected to each agent.

In accordance with a further aspect of the present invention, the step of determining that the first call record campaign is not fully driven includes the steps of establishing an event for each processed call record for the first call record campaign and providing that each event remains an outstanding event until the end of the processed call record. The method further includes the step of formulating a number of supported events for the first call record campaign which equals the first call record campaign pacing agent ratio multiplied by the number of agents having a first campaign attribute.

After detecting the end of each processed call record on the first call record campaign, the number of outstanding events is determined. Upon determining that the quantity of the outstanding events is less than the number of supported events, the first call record campaign is determined to be not fully driven.

In accordance with a further aspect of the present invention, a first call record group is linked to a second call record group within the first call record campaign before initiating processing of the call records by the telephony system. The ordering of the call record groups, as well as the call record campaigns, may be modified real-time even after the call record campaign has been provided to the telephony system. Further, the step of providing the call record groups to the telephony system includes the step of providing the call record groups to a call record campaign manager included in the telephony system.

In accordance with a further aspect of the present invention, the first and subsequent call record campaigns may be modified real-time after being sent to the telephony platform, by modifying any of the call record selection criteria, campaign call scripts, and/or user defined campaign attributes. Modifications to the call record campaigns may be made after the call record campaigns are provided to the telephony system, thereby altering the manner in which the telephony system processes subsequent call records.

In accordance with a further aspect of the present invention, the method includes the steps of determining the end of all of the outstanding events from the first call record campaign during the transitioning period from the first call record campaign to the second call record campaign and substituting the second call record campaign for the first call record campaign.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Outbound call record campaigns utilized by a telephony system as described by co-pending U.S. patent application, Attorney Docket No. DAVOX-119XX, assigned to the assignee of the present invention and incorporated herein by reference, are predefined by the user with campaign parameters prior to performance of the dialing operations by the telephony system.

Figure 1:
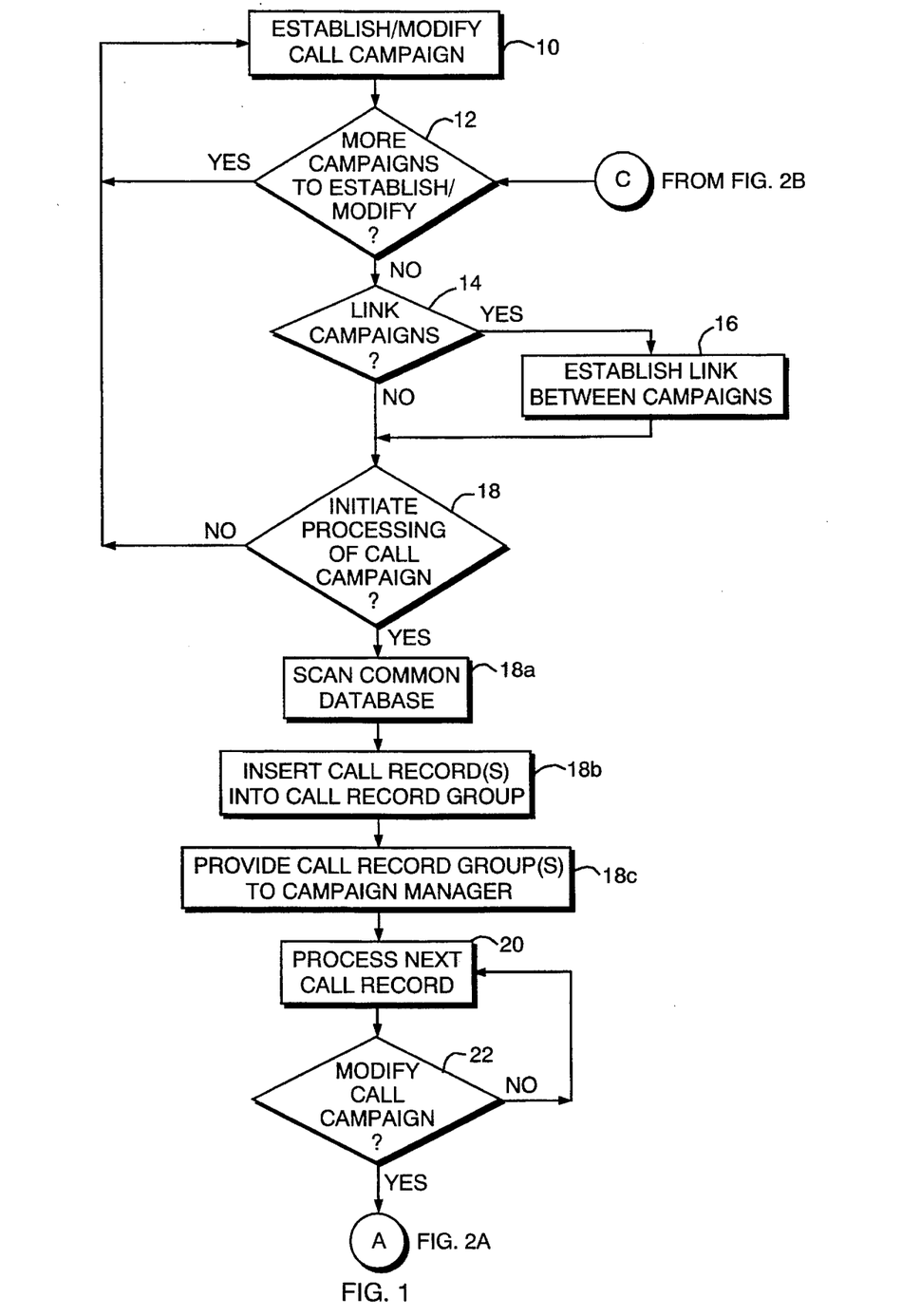
FIG. 1 is a flow chart of the steps for processing call record campaigns in accordance with one aspect of the present invention.

The user first establishes a new or modifies an existing outbound call record campaign, step 10, FIG. 1, at a supervisor station using a graphical user type interface. The user is presented with the option of establishing additional outbound call record campaigns by assigning a new call record campaign name, step 12. At this point, the established call record campaigns remain in an idle state until call record groups are applied to the call record campaign.

Multiple established call record campaigns can be joined or linked together as shown at steps 14 and 16 such that agents logged onto one campaign will automatically be logged on to the next campaign in the flow when the previous campaign ends or is winding down. Typically, campaigns flow linearly, such as campaign A flowing to campaign B, campaign B flowing to campaign C, etc. Alternatively, both campaign A and campaign B may flow into campaign C. Further, in a linear campaign flow as described above, if campaign B ends before campaign A, then the flow controller automatically breaks the link from campaign A to campaign B, and from campaign B to campaign C. A new link from campaign A to campaign C is automatically created by the flow controller to reflect the modified campaign flow.

At step 18, the flow controller is presented with the option of initiating the processing of a first call record campaign, or returning to step 10 to establish or modify other call record campaigns. The initial processing steps prior to processing a call record campaign are described in steps 18a–18c. Initially, at least one call record selection criterion is selected, discussed in greater detail in conjunction with FIG. 2B, to form at least one call record group for the first call record campaign. One common database containing a plurality of call records, generated by the host system, is scanned with the selection criterion, step 18a, utilizing an inclusion type filtering process, to identify at least one call record for the initiated call record campaign meeting the selection criterion.

The identified call record is copied from the common database and inserted into a call record group, step 18b, wherein the call record group is provided to the call record campaign manager, hereinafter referred to as the outbound campaign manager, of the telephony system, step 18c.

In response, the outbound campaign manager begins processing a first call record from the call record group, step 20, as described in co-pending U.S. patent application, Attorney Docket No. DAVOX-119XX.

After the call record campaign is applied to the outbound campaign manager, the user may modify the call record campaign as shown at step 22. By monitoring the campaign statistics at a management center, the user is provided with real-time campaign activity. The running campaign may be modified as described below in conjunction with step 52 et al, FIG. 2A. As the call record campaign is redefined, the telephony system adjusts processing of the call records previously applied, accordingly.

If the call record campaign is not modified, the flow controller returns to step 20 to process the next call record in the campaign flow until the campaign flow is completed. The processing steps of step 20 for flowing a first campaign to a second campaign in the campaign flow is discussed in greater detail in conjunction with FIG. 4.

Figure 2A:
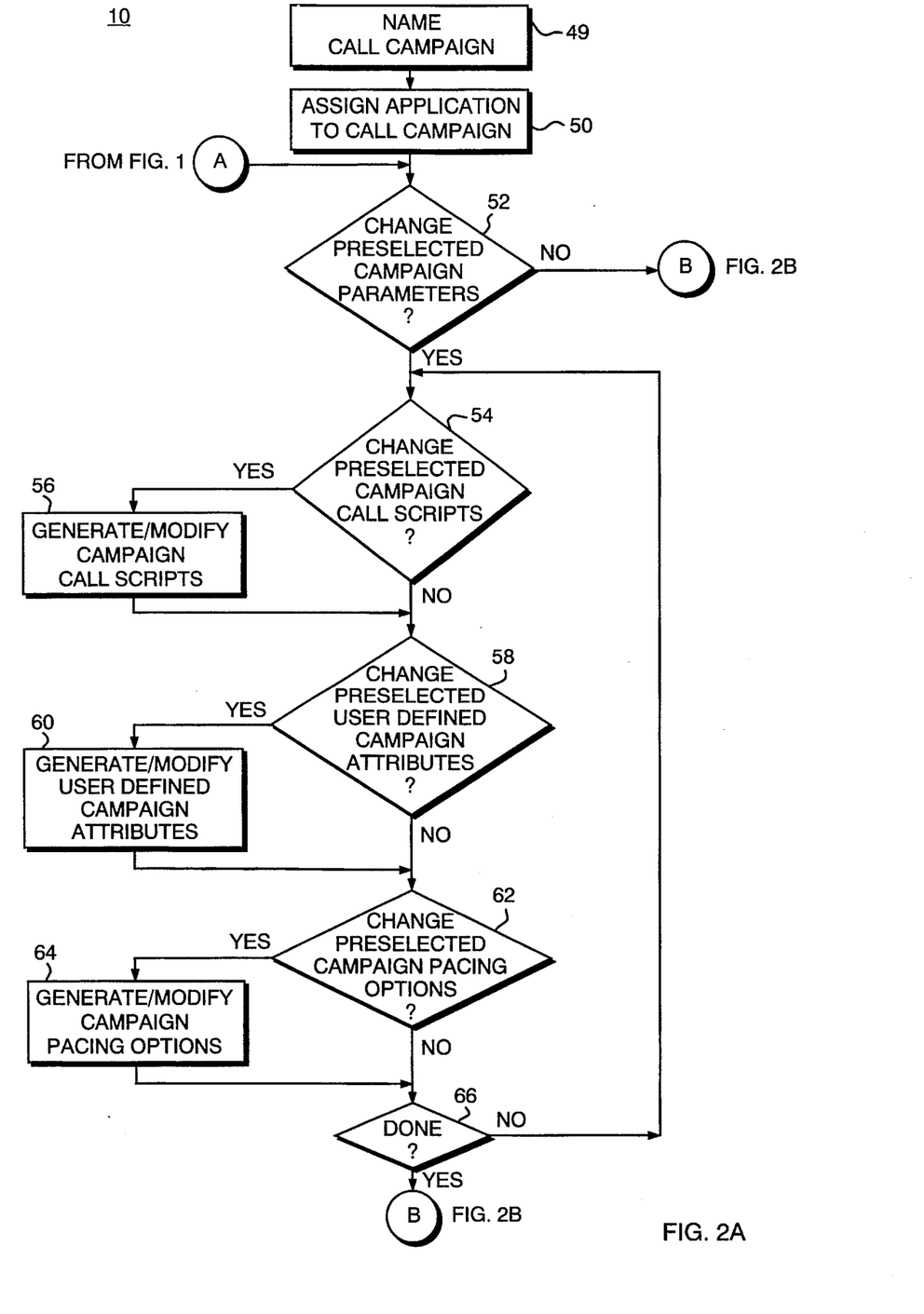
FIGS. 2A and 2B are more detailed flow diagrams showing the steps of establishing and modifying a call record campaign in accordance with one aspect of the present invention, including the steps of creating and selecting call record groups to be provided to the call record campaign.

Referring now to FIG. 2A, the steps of establishing and modifying a call record campaign are discussed in greater detail. Initially, the user establishes an outbound call record campaign by assigning a name to a call record campaign, step 49. Once named, a functional application, such as an outbound dialing campaign, inbound call processing or a Mastercard application, is applied or assigned to the call record campaign, at step 50.

A call record campaign to be modified, after it has been provided to the outbound campaign manager, enters the flow diagram at step 52, since a campaign name and application has previously been assigned to the call record campaign. Otherwise, the modification steps for the call record campaign are identical to the steps of establishing the call record campaign as shown in FIG. 1.

At step 52, the user is provided the option of redefining the call record campaign parameters of the present call record campaign, or may select call record groups for the call record campaign. When a call record campaign is initially established, a set of system default campaign parameters automatically attach to the call record campaign. The user may, either during call record campaign establishment or during modification, elect to change the default system campaign parameters.

At step 54, the predefined default campaign call scripts may be changed. The campaign call scripts define the system behavior of the telephony system while processing the call record campaign once applied and are discussed in greater detail in the above referenced co-pending application, U.S. patent application, Attorney Docket No. DAVOX-119XX. For example, the campaign call script could select a telephone line trunk having certain characteristics and place an outbound dial using a phone number supplied in a call record of the call record campaign. The script may then define what to do in the event of an answer, no answer or a busy tone. New campaign call scripts are assigned to the call record campaign at step 56, either by adding to the previously selected campaign call scripts, or modifying the current campaign call scripts.

The user may also change the current user defined campaign attributes, step 58. Examples of user defined campaign attributes are, busy recall delay-the number of seconds the dialer will wait to redial a busy number; rings for no answer—the number of rings the dialer will allow before considering the call a no answer; and answering machine detect—detection of a home answering machine. The user defined campaign attributes are generated or modified at step 60.

Further, current campaign pacing options may be changed at step 62. Call record campaigns may be provided, for example, with two campaign call pacing options, namely, an agent pacing ratio which is a ratio of the number of telephone lines allocated to each agent, and a percent connect option, which varies the rate of dialing by the telephony system to achieve a desired percentage of answered calls to be connected to an agent. The current campaign pacing options are changed at step 64. Those of skill in the art will recognize that processing steps 54, 58 and 62 may be performed in any order and are not bound by the order shown in FIG. 2A. Upon completion of changing the campaign parameters at step 66, the user may go back and redefine the campaign parameters beginning at step 54.

Figure 2B:
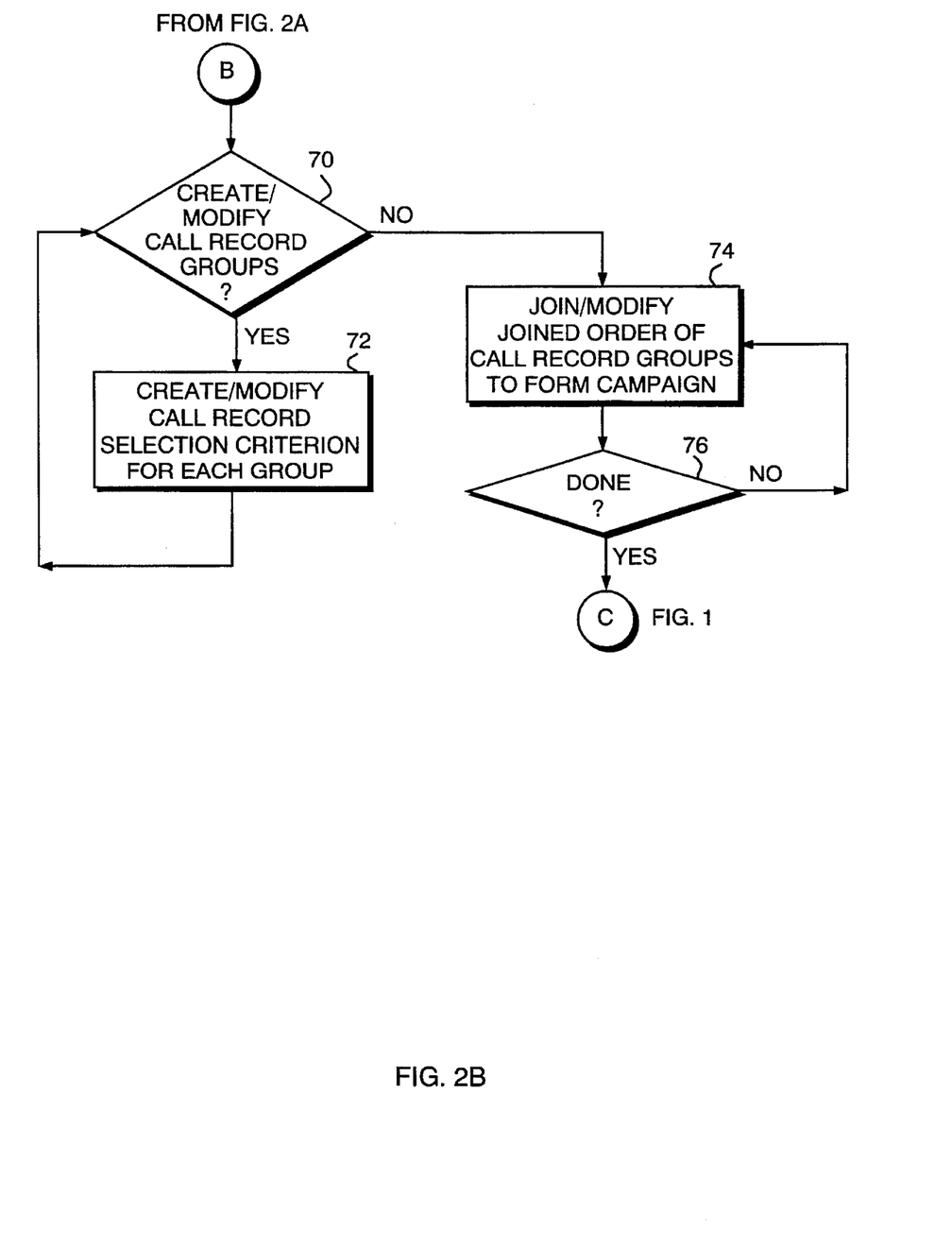

After the campaign parameters have been defined, new call record groups may be created or modified, step 70, FIG. 2B, prior to providing the call record campaign to the outbound campaign manager. A call record campaign is comprised of individual call record groups, each call record group including at least one call record. A call record group is created by generating at least one call record selection criterion as shown at step 72, and by scanning a common database which comprises a plurality of predetermined call records generated by the host system with the call record selection criterion as mentioned above. However, at this juncture of the call record campaign establishment/modification processing step, only the call record selection criterion is generated for each call record group.

As a feature of the present invention, the call record groups may be modified by creating or altering call record selection criteria, step 72, at any time within the call record campaign processing, including after the call record campaign has been provided to the telephony system. Further, additional call record groups may be added or modified to the call record campaign at any time during processing of the call record campaign, step 70.

Typically, call record groups are automatically joined to each other in the order selected within a call record campaign. The user may elect to change the joined order, step 74, thereby dictating the order in which the telephony system processes the call records contained within each call record group of the call record campaign. The joining steps for the call record groups are repeated at step 76 until the call record groups are ordered as desired within the call record campaign.

Figure 3:
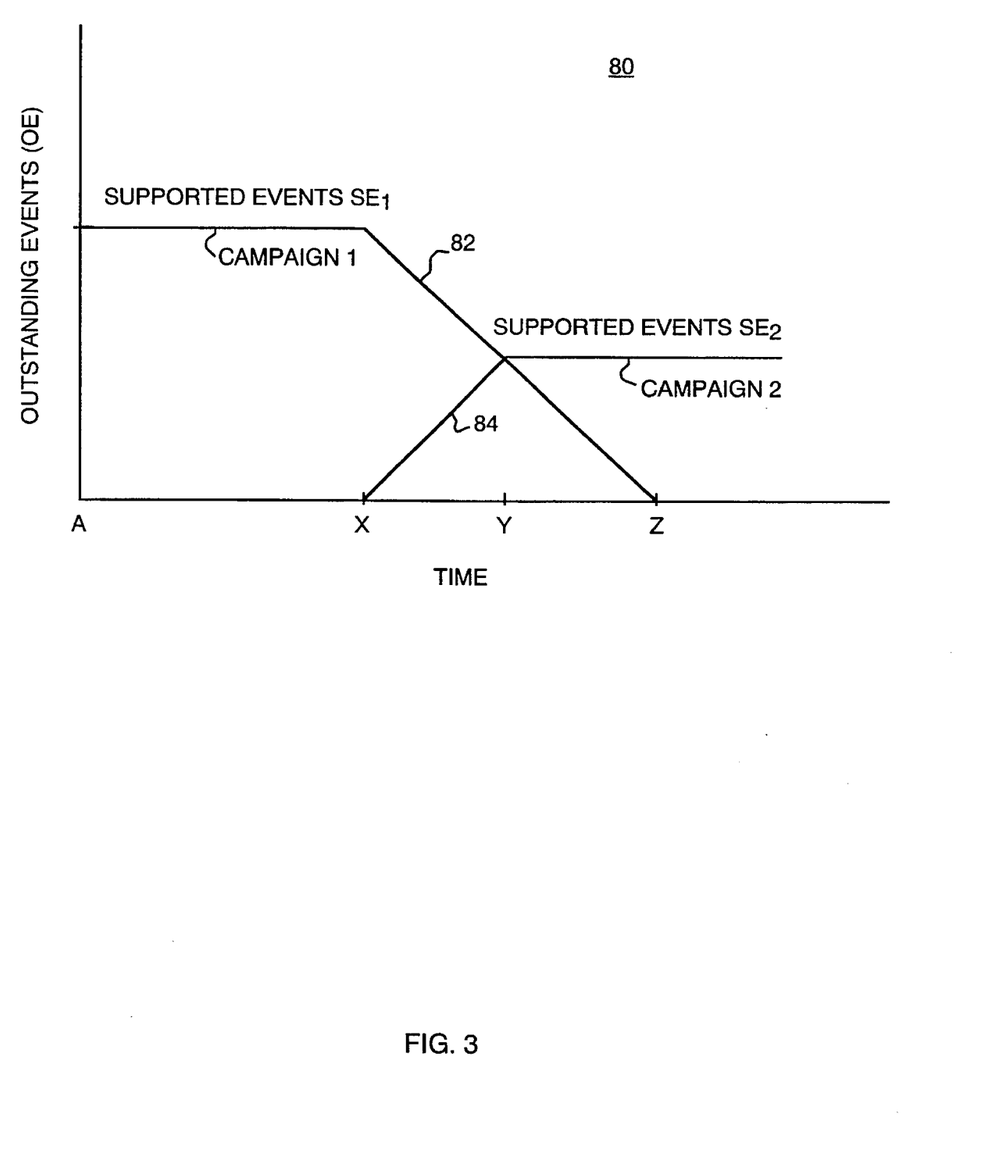
FIG. 3 is a graphical representation of one aspect of the present invention plotting the number of outstanding events over time, for showing the transition of the campaign flow from the first campaign to the second campaign.

Referring to FIG. 3, graph 80 shows the transition period between an ending first campaign 82 and a beginning second campaign 84 within a joined campaign flow. The transition period is defined as the period of time during the ending of first campaign 82 and the overlapping beginning period of second campaign 84, discussed below in greater detail. Graph 80 charts the number of outstanding events occurring at one time within a campaign on the vertical axis versus the processing time of a campaign flow on the horizontal axis.

An outstanding event (OE) is defined as the steps performed by outbound campaign processing for a selected call record, including dialing a telephone number contained within the call record. The maximum number of outstanding events possible at any one time for a given campaign is defined as the supported events (SE). The supported events (SE) is determined according to the formula:

$$SE = (a) \times (r) \quad (1)$$

where a equals the number of available agents assigned to service a specific campaign and r equals the predetermined pacing ratio for the campaign.

As the number of outstanding events equals the supported events number for first campaign 82, $OE_1 = SE_1$, first campaign 82 is determined to be fully driven, that is, first campaign 82 is processing the maximum number of events allowable based on the predetermined pacing ratio. First campaign 82 is fully driven on graph 80 between Time (a) and Time (x).

As first campaign 82 begins to end, the number of outstanding events available to process becomes less than the supported events number, OE<SE. At this point, Time (x) on the horizontal axis, second campaign 84 automatically begins to process call records from second campaign 84 as initiated by the outbound campaign manager. The period of time between Time (x) and Time (z) is referred to as the transition period.

During the transition period, outstanding events are being processed by the telephony system on both first campaign 82 and second campaign 84, thereby maximizing the number of call records processed during the transition from first campaign 82 to second 84. Even as second campaign 84 reaches its supported events number $SE_2$ between Time (y) and Time (z), thereby suspending the generation of new outstanding events on second campaign 164, first campaign 82 is still processing the remainder of its outstanding events. At this juncture, the flow controller may initiate processing of a third campaign by generating events on the third campaign as outstanding events on the first campaign are completed, thereby providing a seamless transition between the first campaign and subsequent campaigns in the campaign flow.

Graph 80 shows the transition period between first campaign 82 and second campaign 84 within a joined campaign flow. Allocation of resources to service multiple campaigns occurring simultaneously is discussed in co-pending U.S. patent application, Attorney Docket No. DAVOX-123XX, and assigned to the assignee of the present invention and fully incorporated herein by reference. Further, those skilled in the art will recognize that the support events number $SE_2$ on second campaign 84 may be a number of outstanding events greater than the supported events number $SE_1$ for first campaign 82.

Figure 4:
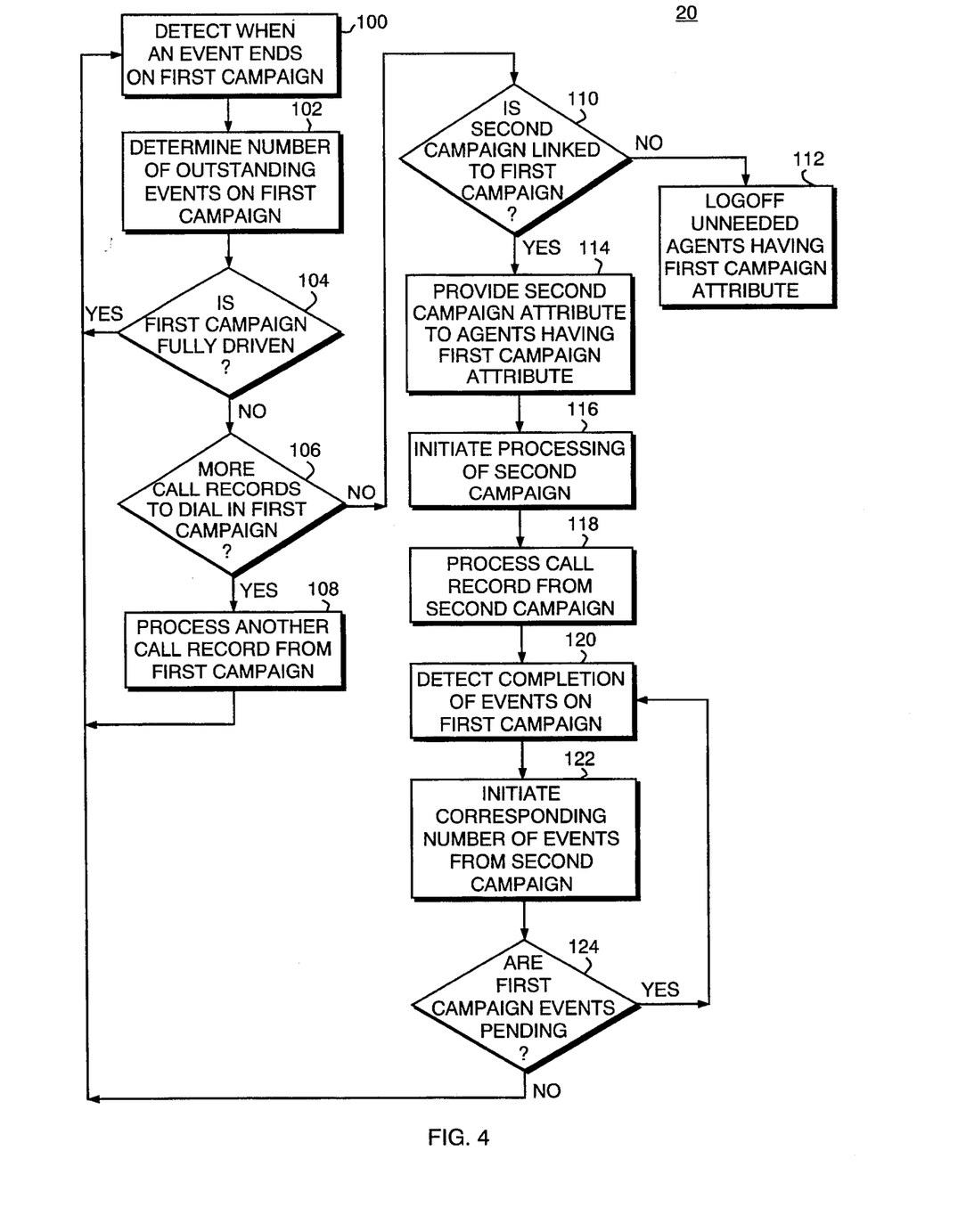
FIG. 4 is a flow diagram showing in greater detail the transition steps from the first campaign to the second campaign of FIG. 3.

Referring to FIG. 4, the processing steps of a call record campaign step 20, FIG. 1, are shown in greater detail including the transitioning steps from a first campaign to a second campaign. The flow controller monitors the call record campaign and detects the completion of outstanding events on the first campaign, step 100, by continuous communication with the system event server. As mentioned above, the functional components and interfaces of the telephony system are described in greater detail in co-pending U.S. patent application, Attorney Docket No. DAVOX-119XX.

After detecting the completion of an outstanding event, the flow controller determines the number of outstanding events on the first campaign, step 102, via communications with the outbound campaign manager. An outstanding event is completed after the call record has been dialed and completely disposed of by the outbound campaign manager. Pending outstanding events are discussed in co-pending U.S. patent application, Attorney Docket No. DAVOX-120XX, assigned to the assignee of the present invention and incorporated herein by reference.

At step 104, the flow controller determines whether the first campaign is being fully driven, $OE_1 \geq SE_1$. If yes, the flow controller returns to step 102 to detect another completed outstanding event. If the first campaign is not fully driven, $OE_1 < SE_1$, the flow controller determines whether more call records are available for dialing within the first campaign, step 106. If another call record is available for dialing, the flow controller directs the outbound campaign manager to process another call record, step 108, and returns to step 102 to detect another completed outstanding event.

If there are no more call records to process, the flow controller determines whether a second campaign is linked to the first campaign in the campaign flow, step 110. In the situation wherein the campaign flow is finished, such as at the end of a business day, or wherein a second campaign has not been linked to the first campaign, the flow controller directs the workstation application server to gradually log off unneeded agents having the first campaign attribute, step 112, while leaving at least one agent to service the pending outstanding events.

Upon determining a second campaign has been linked to the first campaign, the flow controller directs the agent resource manager to modify the campaign attributes of the agents having a first campaign attribute by providing a second campaign attribute to the agents, step 114. The method of assigning campaign attributes to available agents is described in co-pending U.S. patent application, Attorney Docket No. DAVOX-119XX.

As outstanding events are completed on the first campaign and detected by the flow controller, step 120, a corresponding number of call records are processed from the second call record campaign, step 122. At this juncture, the flow controller is simultaneously processing steps 100–106 on the first campaign and steps 120–122 on the second campaign.

The agents having a second campaign attribute are provided to the second campaign in response to the processed call records from the second campaign, thereby smoothly and seamlessly making the transition from the first call record campaign to the second call record campaign. The method of apportioning available agents having both first and second campaign attributes, between the first and second campaigns, is described in co-pending U.S. patent application, Attorney Docket No. DAVOX-123XX, assigned to the assignee of the present invention and incorporated herein by reference.

At step 124, the flow controller determines whether any call record events are still pending on the first campaigns. If yes, then the flow controller returns to step 120 to detect completion of pending call record events from the first campaign and initiate a corresponding number of call record events from the second campaign. Upon completion of all call record events from the first call record campaign, the flow controller returns to step 100 to repeat the processing steps for the second campaign. At this juncture, the second call record campaign becomes the first call record campaign and a linked call record campaign becomes the second call record campaign. The processing steps for the campaign flow continue until the campaign flow comes to an end, such as, at the end of the business day.

Figure 5A:
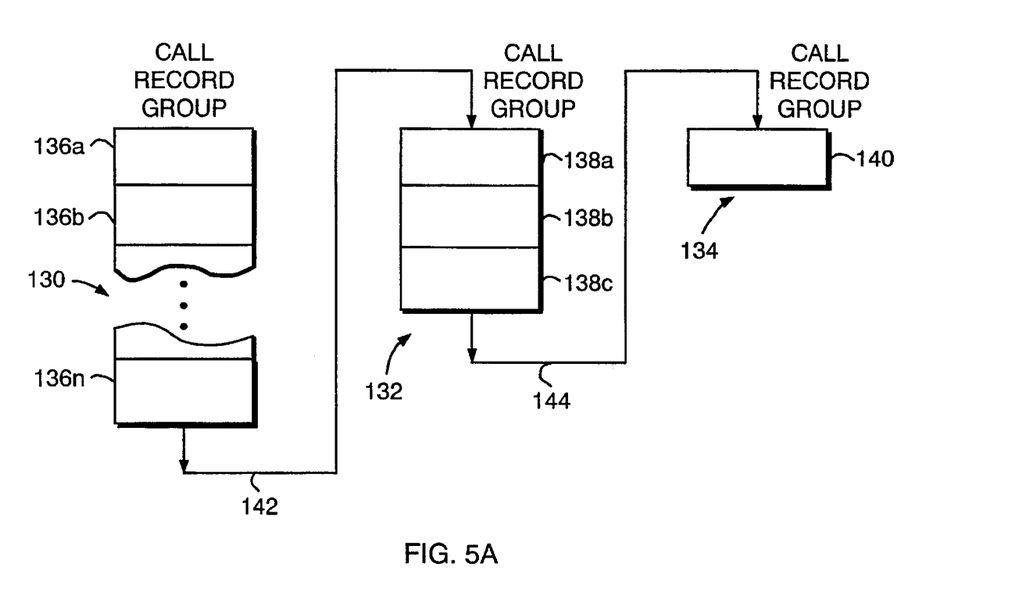
FIG. 5A is a diagrammatical representation of a plurality of joined call record groups.

Referring to FIG. 5A, call record groups 130, 132 and 134 are shown joined together as they are provided to the telephony system by links 142 and 144 illustrating the manner in which call record groups may be joined. Call record group 130 comprises a plurality of call records 136a–136n. Call record group 132 comprises three call records 138a, 138b, 138c and call record group 94 comprises only one call record 140.

Figure 5B:
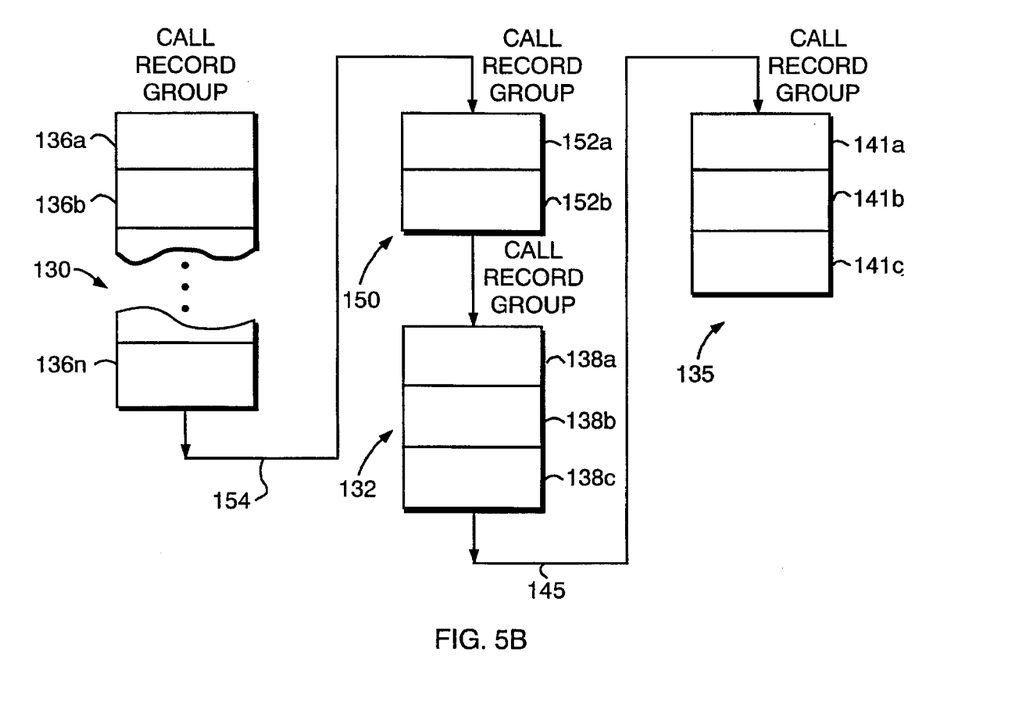
FIG. 5B is a diagrammatical representation of the call record group flow of FIG. 5A modified to join a new call record group to a call record campaign.

Call record group 150, FIG. 5B, comprising two call records 152a and 152b, is shown linked between call record group 130, comprising call records 136a–136n, and call record group 132, comprising call records 138a, 138b and 183c, by link 154, illustrating how the order of call record groups may be modified. Further, call record group 135 is shown modified, comprising three call records 141a, 141b and 141c, linked by link 145 to call record group 132, illustrating how a call record group may be modified by altering the call record selection criteria for the particular call record group.

Figure 6:
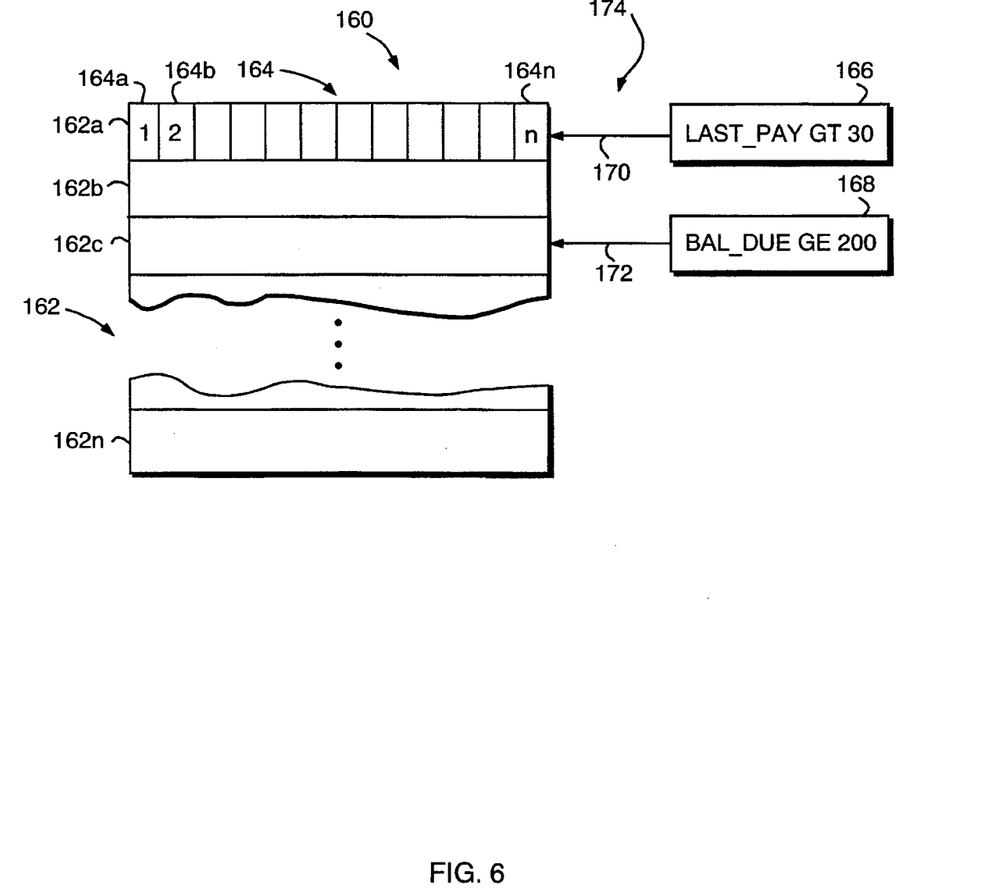
FIG. 6 is a diagrammatical representation showing the steps of creating a call record group by sequentially scanning a common database comprising a plurality of call records with a call record selection criterion.

A common database 160, FIG. 6, comprises a plurality of predetermined call records 162a–162n generally denoted as call record 162. Each call record 162 comprises a plurality of predetermined call record characteristics 164a–164n, including a minimum of two characteristics namely, a telephone number 164a to dial by a telephony system, and an account number 164b, for identifying the call record. Additionally, each call record 162 may include a unique call record identifier by which the telephony system refers to the call record. This unique identifier is assigned by the telephony system. Account number 164b of each call record 162 is utilized by the telephony system to communicate with the host system pertaining customer information contained within each call record 162.

A first call record group may be created, for example, by sequentially scanning database 160 with call record selection criterion 166. As call record selection criterion 166 scans each call record 162 by means of pointer 170, all call records meeting call record selection criterion 166 are filtered into the first call record group. In the present example, all call records 162a–162n including the call record characteristic "last payment greater than 30 days" are filtered into the first call record group.

A second call record group may be created by a second call record selection criterion 168 requesting all call records 162a–162n having a "balance due greater than or equal to $200.00". Call record selection criterion 168 points to each call record 162a–162n by pointer 172 sequentially scanning each call record 162a–162n by moving through common database 160 in direction 174. Those with skill in the art will recognize that call record groups may be created by requiring a combination of preselected call record selection criteria to be met.

Figure 7:
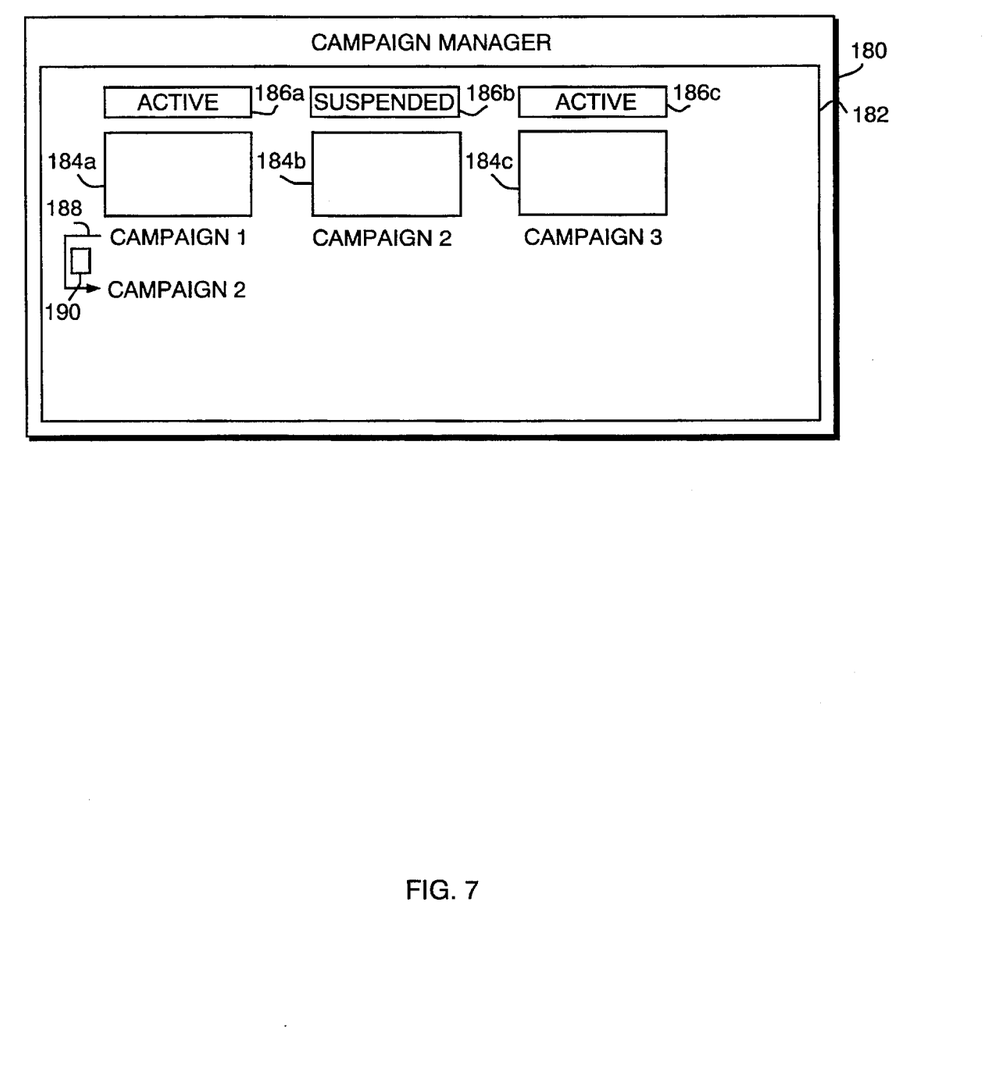
FIG. 7 is a schematic representation showing the steps of joining one call record campaign to another call record campaign.

Once a campaign is established, the user may pull down a campaign flow submenu 182, FIG. 7, from an upper-layer campaign manager submenu 180. The campaign flow submenu 182 identifies all of the named campaigns 184a–184c, and the operating states or status 186a–186c, of each campaign, whether it be active or suspended. The user joins one campaign to another, or redefines a campaign flow, by indicating the desired flow with an arrow 188 on the displayed submenu 182.

At the formation of a call record campaign, recall groups 190 may be selected to automatically flow from an ended campaign to the next campaign in the campaign flow. A recall group 190 is a group of scheduled telephone numbers included in call records of a call record campaign requiring redial by the telephony system due to a no answer or a hang-up.

Accordingly, the system of the present invention provides a method for automatically flowing from a first call record campaign, which is not driven to its maximum capacity, to a linked second call record campaign. As the telephony system detects the end of call records on the first call record campaign, after determining the first call record campaign is not fully driven, a corresponding number of call records is initiated on the second call record campaign, thereby providing a smooth and seamless transition from the first call record campaign to the second call record campaign.

Modifications and substitutions by one of ordinary skill in the art are considered to be within the scope of the present invention which is not to be limited except by the claims which follow.

What is claimed is:

1. A method of controlling the flow of a first call record campaign to a second call record campaign by a telephony system, the method comprising the steps of:

establishing at least a first and second call record campaign on said telephony system, each established call record campaign for controlling the dialing, by said telephony system, of a plurality of predetermined call records;

establishing a call record campaign link between said at least first and second call record campaign;

initiating processing of said first call record campaign;

processing at least one call record from said first call record campaign;

determining said first call record campaign is not driven to maximum capacity;

if said first call record campaign is not driven to said maximum capacity, performing the steps of:

determining if more call records in said first call record campaign remain to be processed said first call record campaign is not driven to a maximum;

if there remain more call records to be processed from said first call record campaign, processing at least one additional call record from said first call record campaign;

if there remains no more call records to be processed from said first call record campaign performing the steps of:

initiating processing of said second call record campaign;

processing at least one call record from said second call record campaign;

detecting the completion of processing of at least one call record from said first call record campaign; and initiating processing of at least a second call record from said second call record campaign, said at least a second call record corresponding to a number of call records detected as completed processing said first call record campaign.

2. The method of claim 1, wherein the step of initiating processing said first call record campaign, comprises the steps of:

sequentially scanning a common database including said plurality of predetermined call records, utilizing at least a first call record selection criterion included in said first call record campaign, for identifying a first number of said plurality of predetermined call records meeting said at least a first call record selection criterion;

inserting said first number of said plurality of predetermined call records in at least a first call record group; and providing said at least a first call record group to said telephony system, for processing said first number of said plurality of predetermined call records.

3. The method of claim 1, wherein the step of establishing said at least a first and second call record campaign comprises the steps of:

providing at least one user defined campaign attribute to each of said at least a first and second call record campaign, for establishing the operational parameters of said at least a first and second call record campaign;

providing at least one campaign call script to each of said at least a first and second call record campaign, responsive to said at least one user defined campaign attribute, for controlling the processing of said plurality of predetermined call records by said telephony system; and providing a first preselected campaign pacing option to said first call record campaign and a second preselected campaign pacing option to said second call record campaign, said first preselected campaign pacing option includes a first pacing ratio and said second preselected campaign pacing option includes a second pacing ratio, said first pacing ratio equals a first quantity of said plurality of predetermined call records to be dialed by said telephony system for each said at least one agent having a first campaign attribute, said second pacing ratio equals a second quantity of said plurality of predetermined call records to be dialed by said telephony system for each said at least one agent having a second campaign attribute.

4. The method of claim 3, wherein the step of determining said first call record campaign is not fully driven, comprises the steps of:

establishing an event for processing each said call record from said first call record campaign, each said event remaining an outstanding event until the completion of processing of each said call record from said first call record campaign ;

formulating a number of supported events for said first call record campaign, wherein said number of supported events (SE) equals said first pacing ratio multiplied by a quantity equal to a number of agents having said first campaign attribute;

detecting the completion of processing of each of said call record;

determining a quantity of said outstanding events (OE) after detecting the completion of processing of each said call record; and determining said quantity of said outstanding events is less than said number of supported events (SE).

5. The method of claim 2, wherein said at least a first call record group includes a first call record group and a second call record group, said first and second call record groups joined together by a call record group link, for ordering the processing of said first number of said plurality of predetermined call records in said first call record campaign.

6. The method of claim 2, wherein the step of providing said at least a first call record group to said telephony system comprises the step of providing said at least a first call record group to a call record campaign manager, said call record campaign manager included in said telephony system.

7. The method of claim 2, further including after the step of initiating processing said first call record campaign to said telephony system, the step of modifying at least one of said at least a first call record selection criteria.

8. The method of claim 3, further including after the step of initiating processing said first call record campaign to said telephony system, the step of modifying at least one of said at least one campaign call script.

9. The method of claim 3, further including after the step of initiating said first call record campaign to said telephony system, the step of modifying said at least one user defined campaign attribute.

10. The method of claim 3, further comprising the steps of:

determining the completion of all of said outstanding events from said first call record campaign; and substituting said second call record campaign for said first call record campaign.

11. A method of controlling the flow of a first call record campaign to a second call record campaign by a telephony system, the method comprising the steps of:

establishing at least a first and second call record campaign on said telephony system, each established call record campaign for controlling the dialing, by said telephone system, of a plurality of predetermined call records, said step of establishing said at least a first and second call record campaign including the steps of:

providing at least one user defined campaign attribute to each of said at least a first and second call record campaign;

providing at least one campaign call script to each of said at least a first and second call record campaign, said at least one campaign call script responsive to said at least one user defined campaign attribute, for controlling the processing of said plurality of predetermined call records by said telephony system; and providing a first preselected campaign pacing option to said first call record campaign and a second preselected campaign pacing option to said second call record campaign, said first preselected campaign pacing option including a first pacing ratio and said second preselected campaign pacing option including a second pacing ratio, wherein said first pacing ratio equals a first quantity of said plurality of predetermined call records to be dialed by said telephony system for each said at least one agent having a first campaign attribute, said second pacing ratio equals a second quantity of said plurality of predetermined call records to be dialed by said telephony system for each said at least one agent having a second campaign attribute;

establishing a call record campaign link between said at least first and second call record campaign;

initiating processing of said first call record campaign;

processing at least one call record from said first call record campaign;

determining said first call record campaign is not driven to a maximum capacity;

if said first call record campaign is not driven to said maximum capacity, performing the steps of:

determining if more call records in said first call record campaign remain to be processed;

if there remain more call records to be processed from said first call record campaign, processing at least one additional call record from said first call record campaign;

if there remains no more call records to be processed from said first call record campaign performing the steps of:

initiating processing of said second call record campaign;

processing at least one call record from said second call record campaign;

detecting the completion of processing of at least one call record from said first call record campaign; and initiating processing of at least a second call record from said second call record campaign, said to at least a second call record corresponding to a number of call records detected as completed processing from said first call record campaign.

* * * * *